(12) United States Patent
Varrato

(10) Patent No.: US 11,995,227 B1
(45) Date of Patent: May 28, 2024

(54) CONTINUED MOVEMENT OUTPUT

(71) Applicant: Cirque Corporation, Sandy, UT (US)

(72) Inventor: Steven Varrato, South Jordan, UT (US)

(73) Assignee: Cirque Corporation

( * ) Notice: Subject to any disclaimer, the term of this patent is extended or adjusted under 35 U.S.C. 154(b) by 0 days.

(21) Appl. No.: 18/123,459

(22) Filed: Mar. 20, 2023

(51) Int. Cl.
*G06F 3/045* (2006.01)
*A63F 13/214* (2014.01)
*G06F 3/01* (2006.01)
*G06F 3/044* (2006.01)
*G06T 13/40* (2011.01)
*G06T 15/20* (2011.01)

(52) U.S. Cl.
CPC ............ *G06F 3/011* (2013.01); *A63F 13/214* (2014.09); *G06F 3/044* (2013.01); *G06T 13/40* (2013.01); *G06T 15/20* (2013.01)

(58) Field of Classification Search
CPC ........ G06F 3/011; G06F 3/044; A63F 13/214; G06T 13/40
USPC ......................................................... 345/174
See application file for complete search history.

(56) References Cited

U.S. PATENT DOCUMENTS

| 7,400,318 B2 | 7/2008 | Gerpheide | |
|---|---|---|---|
| 2014/0118281 A1* | 5/2014 | Baker | G06F 3/04883 345/173 |
| 2014/0267142 A1* | 9/2014 | MacDougall | G06F 3/005 345/174 |
| 2016/0239172 A1* | 8/2016 | Lynch | G06F 3/04883 |
| 2018/0329622 A1* | 11/2018 | Missig | G06F 3/04886 |
| 2022/0230379 A1* | 7/2022 | Shriram | G06F 3/0482 |

FOREIGN PATENT DOCUMENTS

WO PCT/US2022/019681 10/2022

* cited by examiner

*Primary Examiner* — Jonathan M Blancha

(57) ABSTRACT

Initiating continued movement output may include a sensor with at least one capacitance sense electrode, a controller in communication with the sensor, memory in communication with the controller, and programmed instructions stored in the memory and configured, when executed, to cause the capacitance controller to detect a first characteristic of a movement input corresponding to an object moving proximate the sensor along a capacitance movement vector, apply a display movement vector to an output in a display, detect a second characteristic of the movement input corresponding to the object reaching an edge of the field of the sensor and continue to apply the display movement vector in the display as an output in response to detecting the second characteristic of the movement input, where the display movement vector magnitude and direction are determined by the capacitance movement vector magnitude and direction.

16 Claims, 15 Drawing Sheets

US 11,995,227 B1

CONTINUED MOVEMENT OUTPUT

FIELD OF THE DISCLOSURE

This disclosure relates generally to systems, devices, and methods for initiating a continued movement output. In particular, this disclosure relates to systems, devices, and methods for initiating continued movement output in response to detecting a user's input moving beyond an edge of the field of a capacitance sensor.

BACKGROUND

A touch pad is often incorporated into laptops and other devices to provide a mechanism for giving inputs to the device. For example, a touch pad may be positioned adjacent to a keyboard in a laptop and include a surface that can be touched by the user. Touch pads may operate using capacitive sensing, a technology that senses the change of capacitance where a finger touches the pad. In some examples, the moving a finger, stylus, or another type of object adjacent on the touch pad may cause a cursor to move on a display in communication with the touch pad.

An example of a touch pad is disclosed in U.S. Pat. No. 7,400,318 issued to George Gerpheide, et al. This reference discloses a touch pad and measurement circuitry for enabling input to a computer or other electronic device. The system includes an X electrode, a Y electrode, a common sensing electrode, and a "water" electrode, wherein these four separate electrodes can be implemented in various physical configurations to obtain the desired effects, wherein moisture and water droplets can be identified and compensated for so as not to interfere with the input of data, wherein noise rejection is achieved by using a time aperture filtering method, wherein an improved scanning technique focuses scanning around an identified input object, wherein an adaptive motion filter responds to the speed and acceleration of an object being tracked, and wherein the measurement circuitry has an increased dynamic range enabling the touch pad to operate with greater tolerances to manufacturing variances. This reference is herein incorporated by reference for all that it contains.

An example of initiating a movement command on a touch surface is disclosed in WIPO patent No. PCT/US2022/019681 issued to Luke Timmins, et al. This reference discloses techniques for implementing dynamic movement control on a virtualized physical controller, comprising receiving, on a touch-screen display, an indication of a first touch input received from a user at a first location, determining, based at least in part on a distance between the first location and a second location associated with an origin point for an input mechanism being less than a threshold distance value, that a persistent directional input has been initiated, maintaining the persistent directional input as long as touch input is continuously detected, and while the persistent directional input is maintained: monitoring a touch input vector associated with the persistent directional input, upon detecting an angular change in the touch input vector that is greater than a threshold change value, determining that a reversal input has been provided, and causing the avatar to perform a reversal action corresponding to the reversal input. This reference is herein incorporated by reference for all that it contains.

SUMMARY

In one embodiment, a system for initiating continued movement output may include a sensor with at least one capacitance sense electrode, a controller in communication with the sensor, memory in communication with the controller, and programmed instructions stored in the memory and configured, when executed, to cause the capacitance controller to detect a first characteristic of a movement input corresponding to an object moving proximate the sensor along a capacitance movement vector, apply a display movement vector to an output in a display, detect a second characteristic of the movement input corresponding to the object reaching an edge of the field of the sensor and continue to apply the display movement vector in the display as an output in response to detecting the second characteristic of the movement input, where the display movement vector magnitude and direction are determined by the capacitance movement vector magnitude and direction.

The sensor may be part of a virtual reality controller.

The programmed instructions may be configured, when executed, to interrupt the output in response to a user interaction.

The movement vector may include both an x and a y component.

The output may control an avatar in the display.

The output may control a cursor in the display.

The output may control user perspective in the display.

The programmed instructions may be configured, when executed, to detect the second characteristic of the movement input within a predefined area adjacent to the edge of the field of the sensor.

The predefined area may be within at least 5% of a dimension of the sensor to the edge of the field of the sensor.

The programmed instructions may be configured, when executed, to apply a predefined output in response to detecting user interaction after detecting the second characteristic of the movement input.

The programmed instructions may be configured, when executed, to discontinue to apply the display movement vector in response to a user command.

The programmed instructions may be configured, when executed, to cause the magnitude of the display movement vector to decrease over time.

The decrease in the magnitude of the display movement vector may be determined by user interaction.

The user interaction may include repeated detected inputs.

The decrease in the magnitude of the display movement vector in response to repeated detected inputs may include detecting multiple capacitance movement vectors with the same direction within a predetermined amount of time.

The magnitude of the display movement vector may be adjusted, at least in part, by an initial magnitude of the capacitance movement vector.

In one embodiment, a computer-program product for initiating continued movement output may include non-transitory computer-readable medium storing instructions executable by a processor to detect a first characteristic of a movement input corresponding to an object moving proximate the sensor along a capacitance movement vector, apply a display movement vector to an output in a display, detect a second characteristic of the movement input corresponding to the object reaching an edge of the field of the sensor, and continue to apply the movement vector in the display as an output in response to detecting the second characteristic of the movement input, where the display movement vector magnitude and direction are determined by the capacitance movement vector magnitude and direction.

In one embodiment, a method for initiating continued movement output may include detecting a first characteristic of a movement input corresponding to an object moving proximate the sensor along a capacitance movement vector, applying a display movement vector to an output in a display, detecting a second characteristic of the movement input corresponding to the object reaching an edge of the field of the sensor, and continuing to apply the movement vector in the display as an output in response to detecting the second characteristic of the movement input, where the display movement vector magnitude and direction are determined by the capacitance movement vector magnitude and direction.

Figure 1:
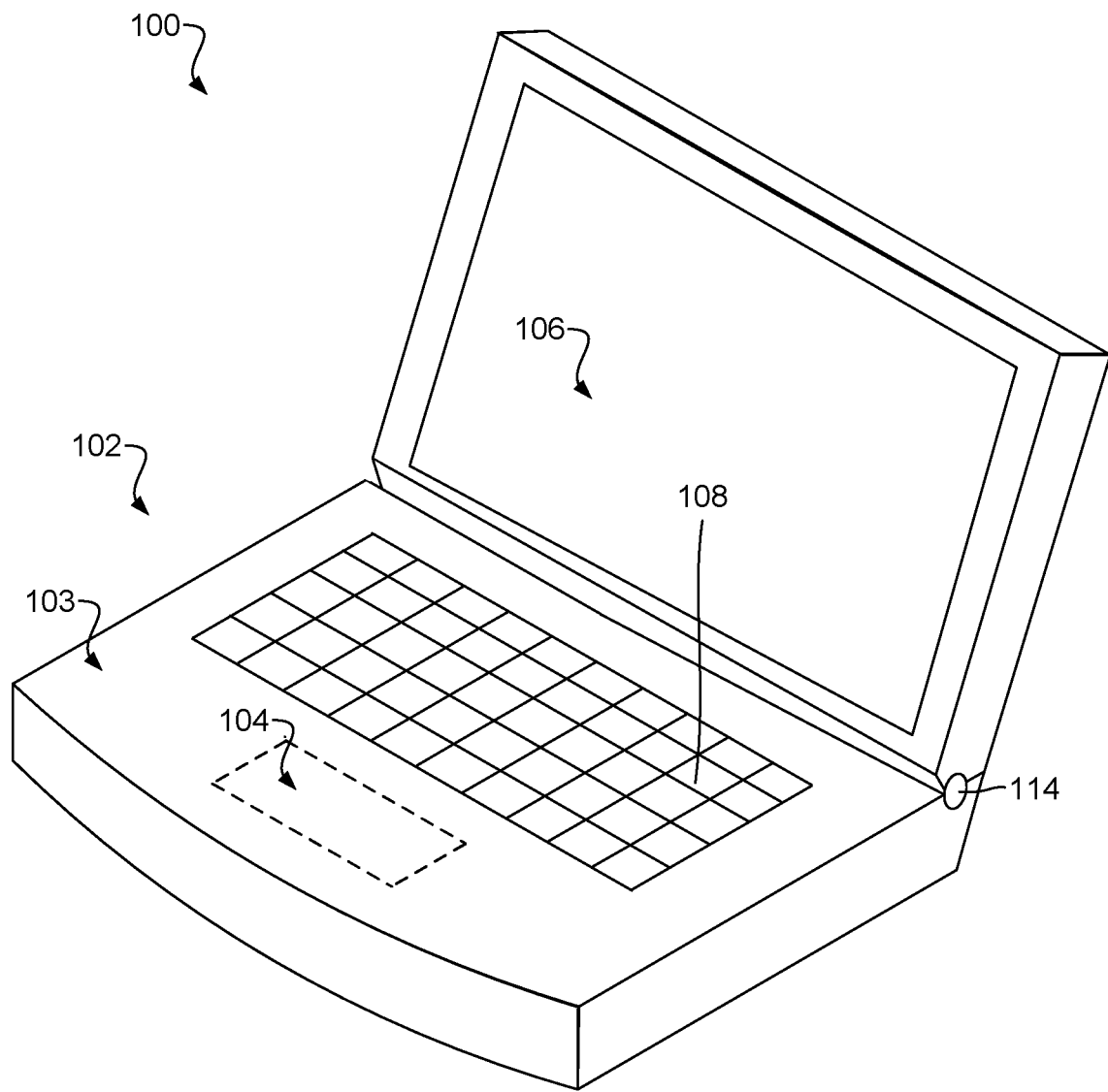
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "user interaction" may generally refer to a detected movement of an object controlled by a user near or on a capacitance reference surface with the intent of controlling an object in a display. In some examples, a user interaction may occur when an object used by a user approaches the sensor. In some examples, a user interaction may occur when the object controlled by the user performs a specific, predefined motion on or near a capacitance reference surface. Examples may include a movement on or near a capacitance reference surface with an identifiable speed and direction, an object pressing onto a capacitance reference surface with an identifiable increase in measured capacitance, or a movement on or near a capacitance reference surface along a specific, predetermined path.

For the purposes of this disclosure, the term "display movement vector" may generally refer to a quantity with a direction and a speed that is applied to an object in a display. In some examples, a movement vector may include an x component and a y component. In some examples, a movement vector may include an x component, a y component, and a z component. In some examples, a movement vector's direction in the display may be determined by the direction of a detected movement of an object moving proximate a capacitance sensor. In some examples, the speed of the movement vector may be based, at least in part, on the detected speed of the object moving proximate the capacitance sensor.

For the purposes of this disclosure, the term "capacitance movement vector" may generally refer to a quantity with a direction and a speed that is calculated based on a movement input on or near a capacitance sensor. In some examples, the capacitance movement vector may be calculated with a controller of a capacitance module. In some examples, the direction of a capacitance movement vector is calculated based on an average of the direction of the movement input. In some examples, the speed of the capacitance movement vector may be calculated based on an average of the speed of the movement vector.

For the purposes of this disclosure, the term "field of the sensor" may generally refer to an area proximate the sensor in which the sensor can detect a change in capacitance caused by an object moving proximate the sensor. The area may have at least one edge, beyond which the sensor can detect a change in capacitance caused by an object moving. In some examples, the area may include only the area directly above the sensor. In some examples, the area proximate the sensor may be a three-dimensional area. In such an example, an edge may be considered any line in which on one side of the line the sensor can detect an object and on the other side of the line the sensor cannot.

For the purposes of this disclosure, the term "x component" of a movement vector may generally refer to a direction and/or a magnitude that is aligned with an axis of the user's perception of a display. For example, the axis of the user's perception of a display may be the horizontal axis, which may align with the length of the display. In some examples, the x component may be aligned with a surface of the display. In some examples, the x component may include movement that goes across the display, moves side to side in the display, moves laterally, or moves another movement.

For the purposes of this disclosure, the term "z component" of a movement vector may generally refer to a direction and/or a magnitude that is aligned with an axis of the user's perception of a display and is transverse the x component. For example, the axis of the user's perception of a display may be the vertical axis, which may align with the width of the display. In some examples, the z component is aligned with a surface of the display. In some examples, the z component may include movement that goes along a vertical path, moves up and down in the display, or travels in another direction.

For the purposes of this disclosure, the term "y component" of a movement vector may generally refer to a direction and/or a magnitude that is transverse to the user's perspective of the display. In some examples, the y component may be transverse both the x component and the z component. In some examples, the y component may include movement that goes into or out of the display, changes the depth perception of something depicted, or moves in another direction.

While the examples have been described with the x component, the y component, and the z component aligned with specific directions, in other examples, the x component, the y component, and/or the z component may be switched with one of the other components.

For the purposes of this disclosure, the term "characteristic" may generally refer to a measurable and identifiable aspect of the movement of an object on or near a capacitance reference surface. Examples may include the speed and direction of the movement of an object on or near a capacitance reference surface, or the path of the movement relative to a location on or near a capacitance reference surface.

For the purpose of this disclosure, the term "movement input" may generally refer to the measured change in capacitance of a capacitance module based on the movement of an object on or near a capacitance reference surface of the capacitance module. In some cases, this may include several measured changes in capacitance over a period of time, such as when an object moves along a path. In this case, the measured changes in capacitance along that path over the time of travel of the object may be considered a movement input. The movement input may have a path, a speed, and a length determined by the changes in the capacitance of the capacitance module and the relative time of these changes.

For the purposes of this disclosure, "moving proximate" the sensor may include the object touching and moving across overlay, housing, or other touch surface. The gaps between such touch surfaces and the sensor and/or the thickness of such overlays or other touch surfaces may cause the sensor to be spaced apart from the touch surface that the object can touch. In such examples, the overlay and/or other touch surfaces cause the object to be separated at least some distance from the sensor. In such an example, even when the object is touching the touch surface and/or the overlay, the object is just proximate to the sensor since the object is still spaced at a distance away from the object even though the object is touching the touch surface since the sensor is beneath the touch surface. In other examples, being proximate to the touch surface may include examples where the object hovers over the touch surface and/or overlay such that the object does not come into physical contact with the touch surface and/or overlay. In such an example where the object hovers over the touch surface and/or overlay, the object may still be proximate to the touch sensor.

For the purposes of this disclosure, the term "output in a display" may generally refer to any computer-generated object which can appear in a display and to which a command can be given. Some examples may include a cursor or an avatar in a video game. In some computer applications, the user can control how they view a three-dimensional environment in a third-person perspective or a first-person perspective. In such an example, the perspective on the display is considered to be an output in a display. In some examples, the command given to the object may include a display movement vector.

For the purposes of this disclosure, controlling "user perspective" may generally refer to controlling how a user views information in a display. In one example, this information may be a computer document and controlling user perspective may refer to controlling which part of the document is viewed in the display. In another example, the information may be a perspective of a three-dimensional environment in a computer application. In this case, controlling user perspective may refer to controlling the change in the perspective of the environment.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
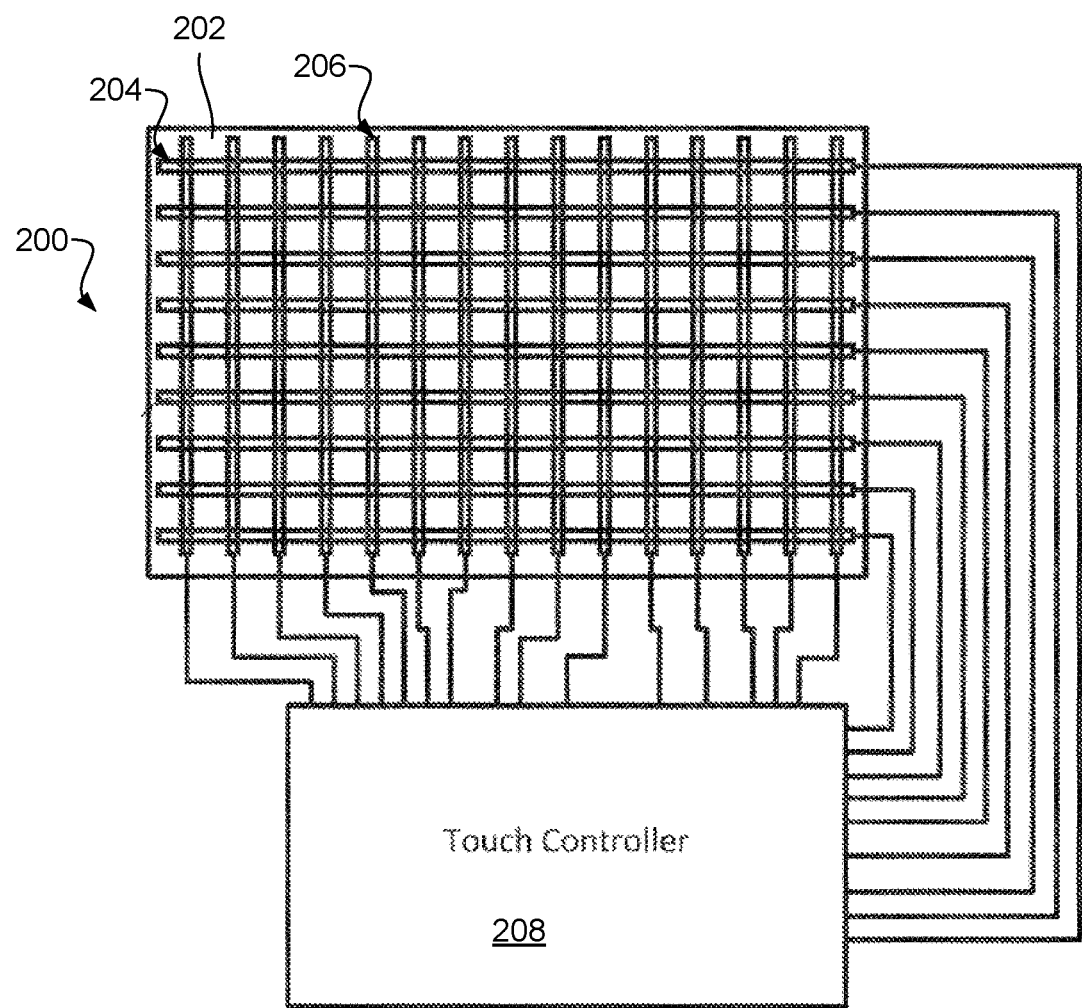
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously.

Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
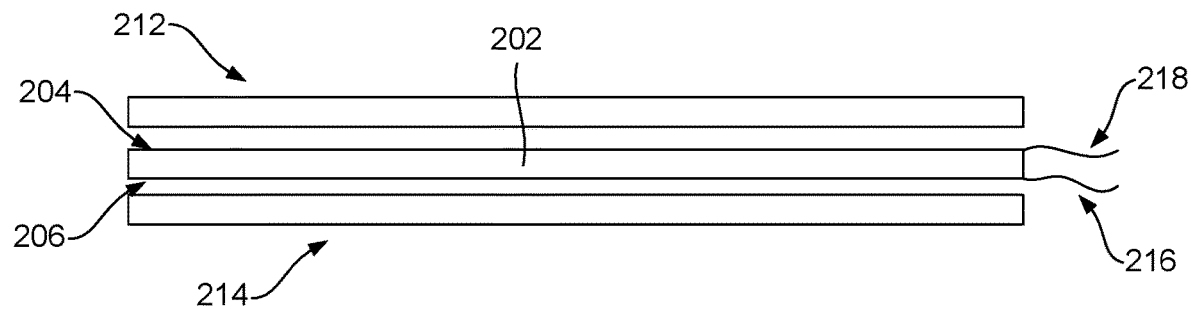
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
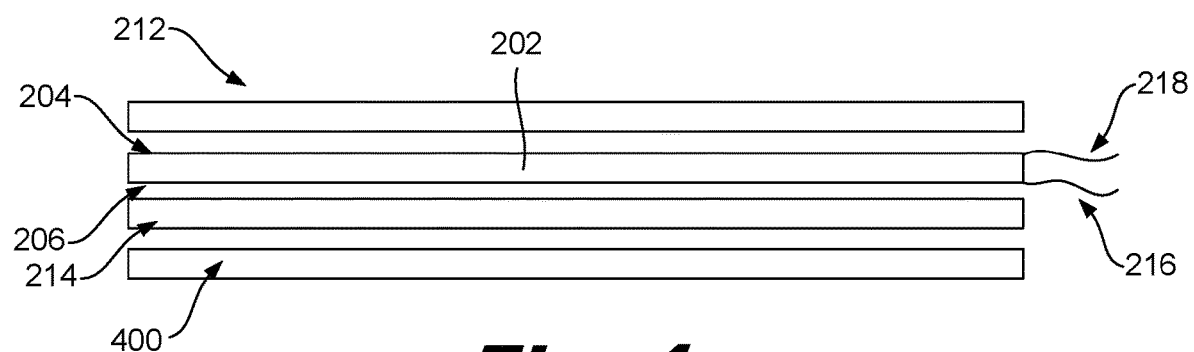
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filament display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
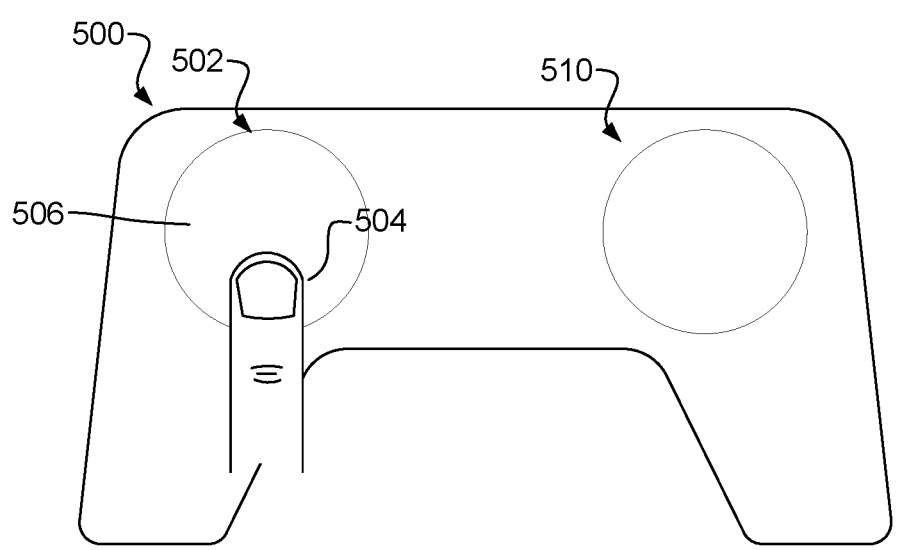
FIG. 5 depicts an example of a gaming controller in accordance with the disclosure.

FIG. 5 depicts an example of a gaming controller 500 with a capacitance module 502 with a touch surface 506. In this example, the object 504 is a finger. Detecting of the finger 504 moving proximate the capacitance module along the touch surface 506 may be used to input commands to an output in a display. In some cases, the capacitance module 502 may be used to control an avatar in a display. In other cases, the capacitance module 502 may be used to control a cursor. In yet other cases, the capacitance module 502 may be used to control a user's perspective in a game or on a webpage. In some examples, the controller 500 may be used in tandem with a virtual reality device. In some examples, the touchpad 502 may be used in tandem with other control elements on the controller 500, but in some examples, one or more capacitance module may be the main control element. In some examples, two controllers with a touchpad each may be used simultaneously, as is used in some virtual reality systems where a user has one control in each hand.

The gaming controller 500 may incorporate more than one capacitance module. For example, the embodiment of FIG. 5 depicts a gaming controller 500 with a first capacitance sensor 502 and a second capacitance sensor 510. In this example, a user may control multiple parameters of the object depicted in the display with separate capacitance modules. While FIG. 5 depicts a specific example of a gaming controller any appropriate type of gaming controller may be used in accordance with the principles of the present disclosure. As a non-exhaustive list of commercial gaming controllers that may be modified to incorporate the principles disclosed herein may include the Nintendo® Switch gaming controller, the Steam Deck™ gaming controller, the Oculus® gaming controller, Sony Playstation® gaming controller, another type of gaming controller, or combinations thereof.

Figure 6:
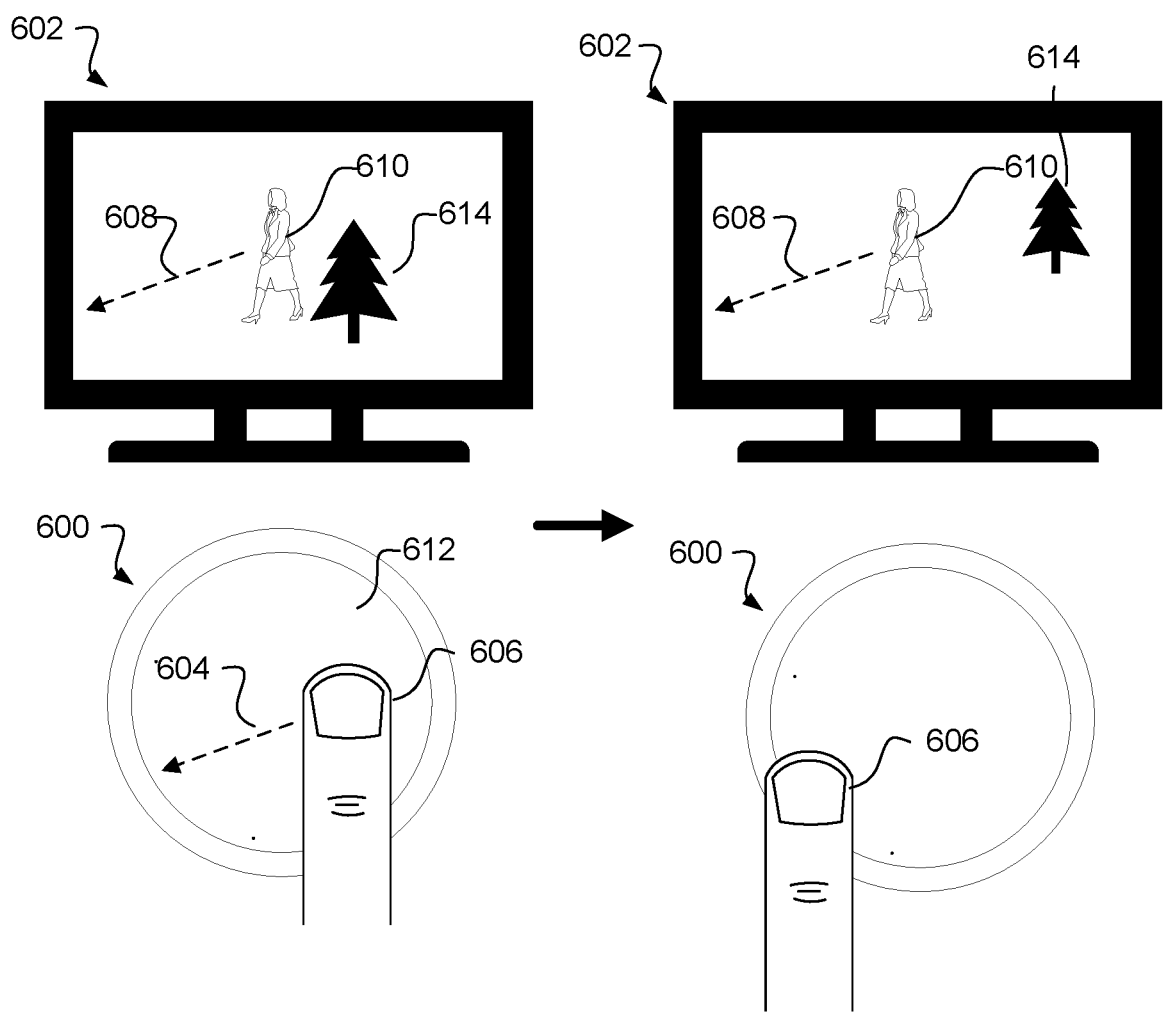
FIG. 6 depicts an example of initiating a continued movement in accordance with the disclosure.

FIG. 6 depicts an example of capacitance module 600 and a display 602. In this example, the object 606 is a finger which is used to provide a movement input to an avatar 610 in a video game depicted in the display 602. In this example, the finger moves across the surface 612 of the capacitance module along a path 604 at a certain speed towards the edge of the surface 612. The display movement vector 608 is applied to the avatar 610 in accordance with the direction and speed of the finger and moves the avatar 610 away from a tree 614 in the display 602. When the finger reaches the edge of the surface 612 and stops, the display movement vector 608 continues to be applied to the avatar 610 in the display 602. In this example, the display movement vector 608 applied to the avatar 610 is determined by a capacitance movement vector determined by the finger 606 moving along the path 604. The display movement vector continued in the avatar even though the finger stopped because certain conditions were met. One of these conditions includes that the movement input of the finger had the characteristic of moving along a path with an identifiable speed and direction. The other condition is that the movement input continued until the finger reached the edge of the surface 612 before the finger stopped moving. While this example describes just two conditions to be met to cause the avatar to continue with the movement vector even though the finger stopped moving, in other examples, additional conditions may be involved to cause the avatar to continue with the display movement vector.

In this example, the display movement vector 608 affects the avatar 610 by causing the avatar to move within a video game in the direction of the movement of the finger. This causes the avatar to move away from the tree 614 in the direction given by the input of the finger. In some examples, the display movement vector may cause the avatar to move away from an enemy, towards an ally, or towards some other objective. In some examples, the speed that the avatar moves may affect the ability of the user to successfully play the video game. Many video games are time-dependent and the speed at which a user can input commands affects the smoothness and playability of the video game. In a traditional gaming implementation, a discontinuance of the display movement vector occurs in response to the finger not being detected by the capacitance module. This may cause user commands to be inefficient and inconsistent due to the user having to enter a movement command originating at a place on the surface, pick their finger up off the surface, move their finger back to the place where the first movement command originated, and enter a similar command as the first.

For example, in a video game in which running away from an enemy is involved, in a traditional gaming implementation, a user may need to make the same movement command with their finger multiple times to successfully move their avatar away. This may cause the movement of the avatar to be slower and more inconsistent than is desired. In this case, the user may need to input a movement vector, pick their finger up, return the finger to the initial place on the surface of the capacitance module and enter the same movement vector. This may also be affected by the capacitance module on gaming controllers being smaller, on average, than those used in other cases. In this case, the user may have an advantage by using a system as depicted in FIG. 6.

In the case depicted in FIG. 6, if the user wanted to move their avatar away from the enemy, they may move their finger across the surface of the capacitance module and reach the edge of the field of the capacitance sensor. This may cause the avatar to move continuously at the speed determined by the initial detected capacitance movement vector of the user's finger.

In some examples, as the finger 606 moves along the path 604 a capacitance controller of the capacitance module 600 may output the location of the finger over time which may result in a computed capacitance movement vector, which may be saved in memory or in a cache. This capacitance movement vector then may determine the display movement vector 608 which may be applied to the avatar 610. When the finger is detected reaching the edge of the surface 612, the capacitance controller may continue to output the display movement vector. In other examples, when the finger reaches the edge of the surface, the capacitance controller may output a copy of the location of the finger over time as it moved along the path 604, mimicking the initial input of the user. In such an example, the capacitance controller of the capacitance module 600 may not compute a capacitance movement vector, but the mimicked signal may determine the magnitude and direction of the display movement vector.

In some examples, the display movement vector 608 may be applied to a camera angle in a video game. In some video games with three-dimensional environments, the camera angle may allow the user to understand where their avatar is within the three-dimensional environment. In some examples, this angle may be centered on the avatar 610. In some examples, two separate capacitance modules may be used to control both the movement of the camera angle and the movement of the avatar.

In some examples, the display movement vector 608 may continue to be applied until a new user interaction is detected to stop the application of the display movement vector. In some cases, detecting the finger 606 moving off the surface 612 may stop the application of the display movement vector. In other cases, the display movement vector may continue to be applied after the finger is detected moving off the edge of the surface 612 and may be stopped when a new input is detected. In some cases, once the display movement vector is applied, a specific input command, such as a detected movement input on the surface 612 in a direction opposite of the initial movement input, may be implemented.

In some examples, the display movement vector 608 may continue to be applied after the finger 606 is detected moving off the surface 612. In some cases, the speed of the display movement vector may decrease over time. In some cases, this decrease may be related to the measured speed of the finger as the finger leaves the surface 612. In some cases, this decrease may be related to the average speed of the finger along the path 604. In some cases, the decrease may be related to repeated detected instances of the finger reaching the edge of the surface 612. In some cases, the decrease may be related to a calculated capacitance movement vector determined by the speed and direction of the finger 606 as the finger moves across the surface 612.

In some examples, the display movement vector 608 may be changed by a detected user interaction after the finger 606 reaches the edge of the surface 612. In some cases, the user interaction may be a movement of the finger aligned to the edge of the surface 612 toward the upper part of the surface 612. In some cases, the user interaction may be a movement of the finger 606 aligned to the edge of the surface 612 toward the lower part of the surface 612. In some cases, the user interaction may be the finger 606 moving off the surface 612. In some cases, the user interaction may be the finger moving in the opposite direction of the movement vector, away from the edge along the surface 612. In some cases, the user interaction may be a detected increase in the surface area of the finger in contact with the surface 612. In other cases, the user interaction may be a measured increase in the capacitance. In yet other cases, the user interaction may be the absence of a detected change in the capacitance with the capacitance sensor.

In some examples, after the finger 606 is detected reaching the edge of the surface 612, a user interaction may end the application of the display movement vector 608. In some examples, the change in the display movement vector due to a detected user interaction may be an increase in the speed of the display movement vector. In some examples, the change in the display movement vector due to a detected user interaction may be a decrease in the speed of the display movement vector. In some examples, the change in the display movement vector due to a detected user interaction may be a change in the direction of the display movement vector.

In some examples, after the finger 606 is detected reaching the edge of the surface 612, a second detected input may be involved before the capacitance module continues to apply the display movement vector 608. For example, the capacitance module may detect a user input that moves across the edge and off the surface of the capacitance module. The capacitance module may then wait until a second input aligned with the first that moves across the edge and off the surface of the capacitance module is detected. After this second input is detected, the capacitance module may then continue to apply the display movement vector in relation to the speed and direction of a capacitance movement vector based on the speed and direction of the second movement input. In some examples, multiple detected inputs may be involved before the capacitance module continues to apply the display movement vector.

Figure 7:
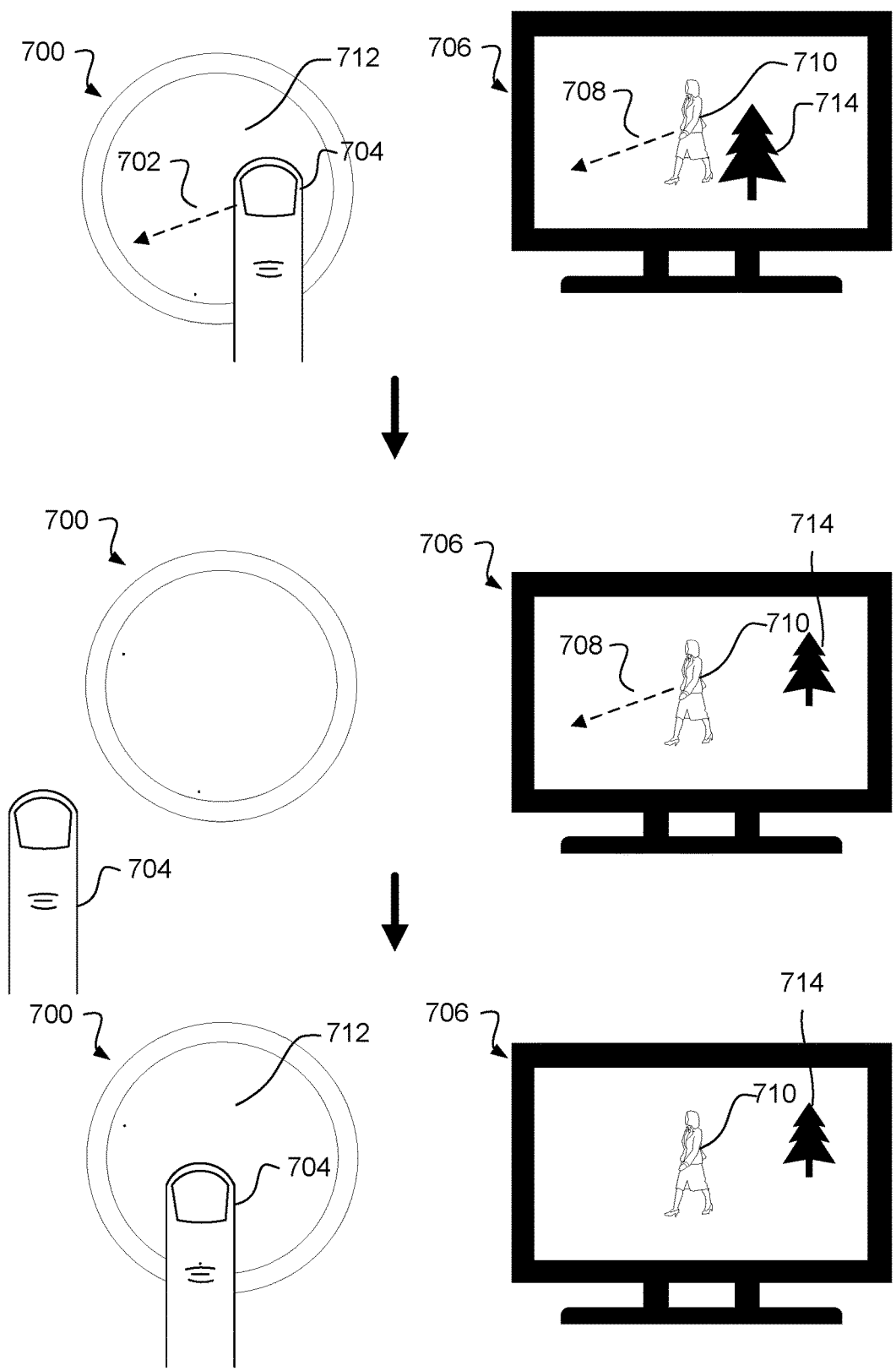
FIG. 7 depicts an example of stopping a continued movement in accordance with the disclosure.

FIG. 7 depicts an example of capacitance module 700 and a display 706. In this example, the object 704 is a finger which is used to provide inputs to an avatar 710 in a video game depicted in the display 706. In this example, the finger moves across the surface 712 of the capacitance module along a path 702 at a certain speed towards the edge of the surface 712. The display movement vector 708 is applied to the avatar 710 in accordance with the direction and speed of the finger and moves away from a tree 714 in the display 706. When the finger reaches the edge of the surface 712 and leaves the surface, the display movement vector 708 continues to be applied to the avatar 710 in the display 706. Finger 704 then returns to the surface 712 which causes the display movement vector 708 to stop being applied. In this example, the finger reaching the edge of the surface causes the display movement vector in the avatar to continue. This display movement vector continues to be applied until the finger is again detected by the capacitance module. In other examples, some other input may be implemented to stop applying the display movement vector.

Figure 8:
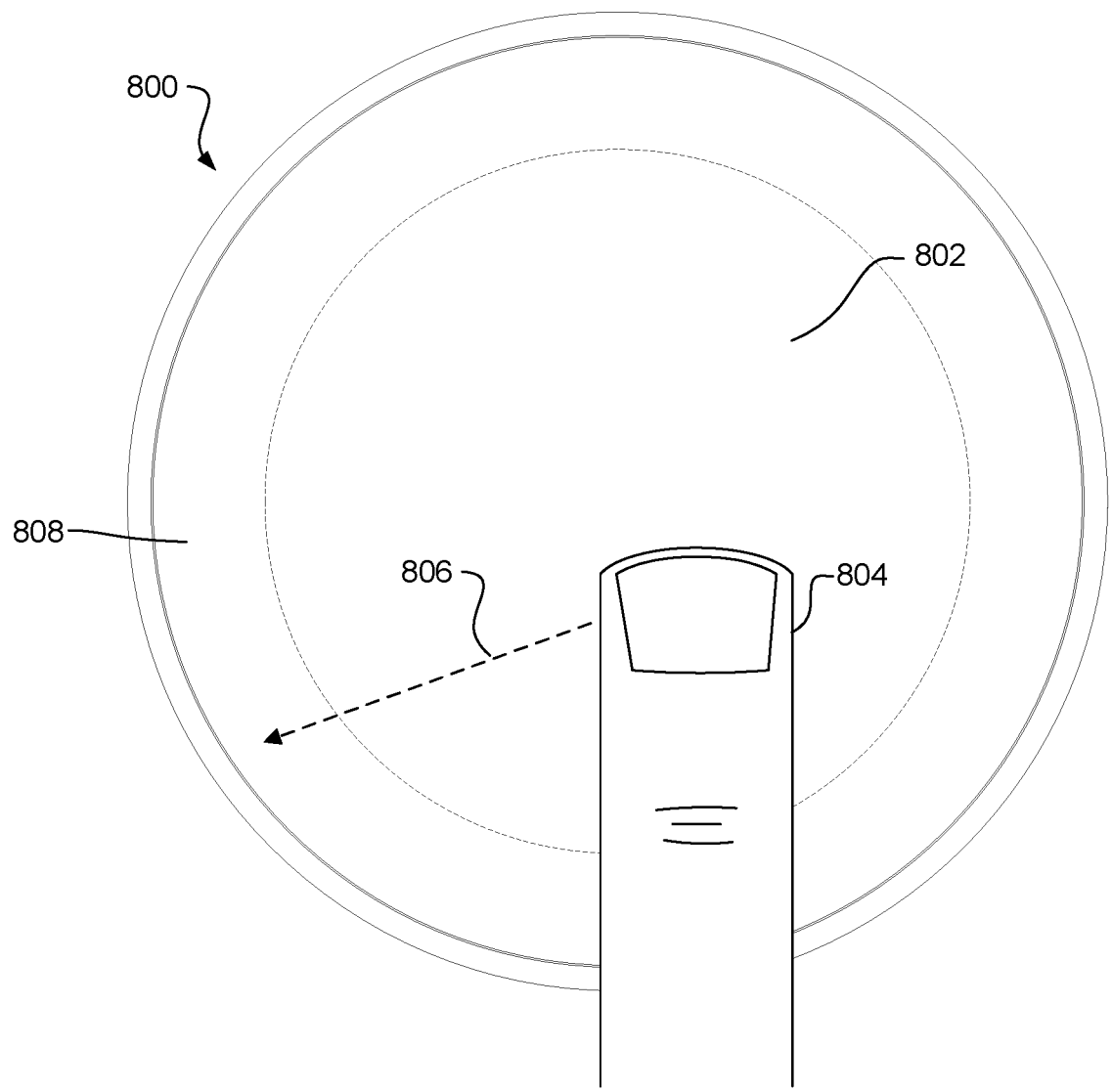
FIG. 8 depicts an example of a movement toward an edge of a touchpad in accordance with the disclosure.

FIG. 8 depicts an example of capacitance module 800. In this example, the object 804 is a finger. In this example, the finger moves across the surface 802 of the capacitance module along 800 a path 806 at a certain speed towards a predefined region 808. A display movement vector is output in accordance with a capacitance movement vector determined by the movement of the finger 804. As the finger 804 enters the region 808, the display movement vector continues to be applied, and may continue to be applied after the finger 804 is detected moving off the surface.

In this example, the predefined region 808 is considered to be the edge of the surface 802, and the region is a circular ring surrounding the central part of the surface. In this example, the central portion of the surface may be an area that is commonly used by users in entering commands in a video game. In such an example, the region 808 may be an area that is used less commonly unless the user wishes to initiate a continued movement command. In some examples, the region 808 may be considered the entire edge of the surface 802, surrounding the inner part of the surface on all sides with a margin of five percent of a dimension of the surface. However, in other examples, the region may be a specific portion of the edge of the surface. In yet other examples, the region may be any appropriate shape or region adjacent to the edge of the surface.

In the depicted example, the finger 804 moves in relation to the surface 802 of the capacitance module 800. In this example, the surface 802 is positioned above the capacitance sensor of the capacitance module 800 with similar dimensions. When the finger 804 is at the edge of the surface 802, the finger is detected by the capacitance sensor to be at the edge of the field of the capacitance sensor and this initiates the continued movement command as described in this example. In some examples, the surface 802 may not be necessary to initiate the continued movement command.

Figure 9:
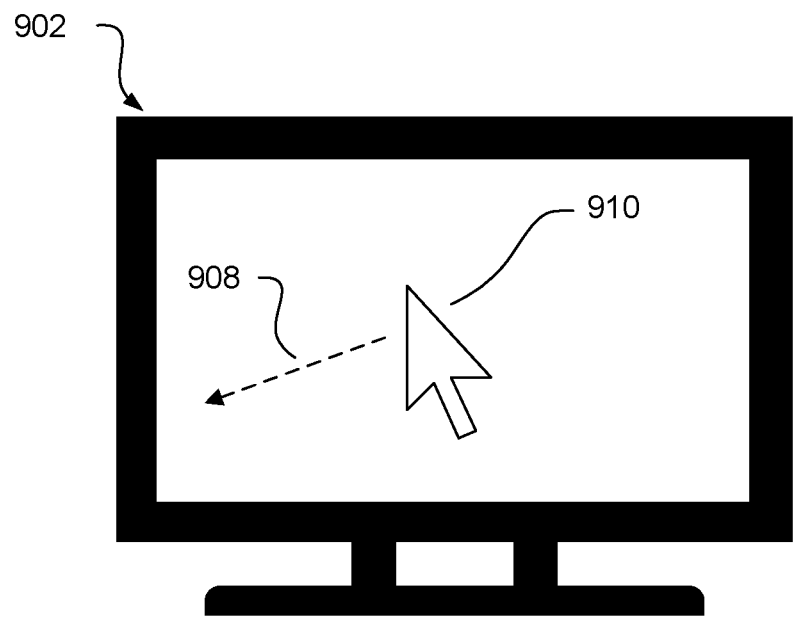
FIG. 9 depicts an example of moving a cursor in accordance with the disclosure.
Figure 9:
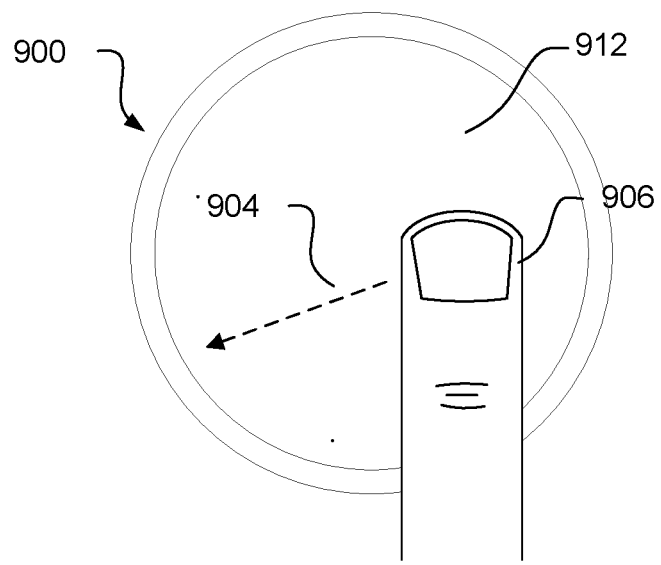

FIG. 9 depicts an example of capacitance module 900 and a display 902. In this example, the object 906 is a finger which is used to provide inputs to a cursor 910 depicted in the display 902. In this example, the finger moves across the surface 912 of the capacitance module 900 along a path 904 at a certain speed towards the edge of the surface 912. The display movement vector 908 is applied to the cursor 910 in accordance with the direction and speed of the finger. When the finger reaches the edge of the surface 912 and stops, the display movement vector 908 continues to be applied to the cursor 910 in the display 902.

Figure 10:
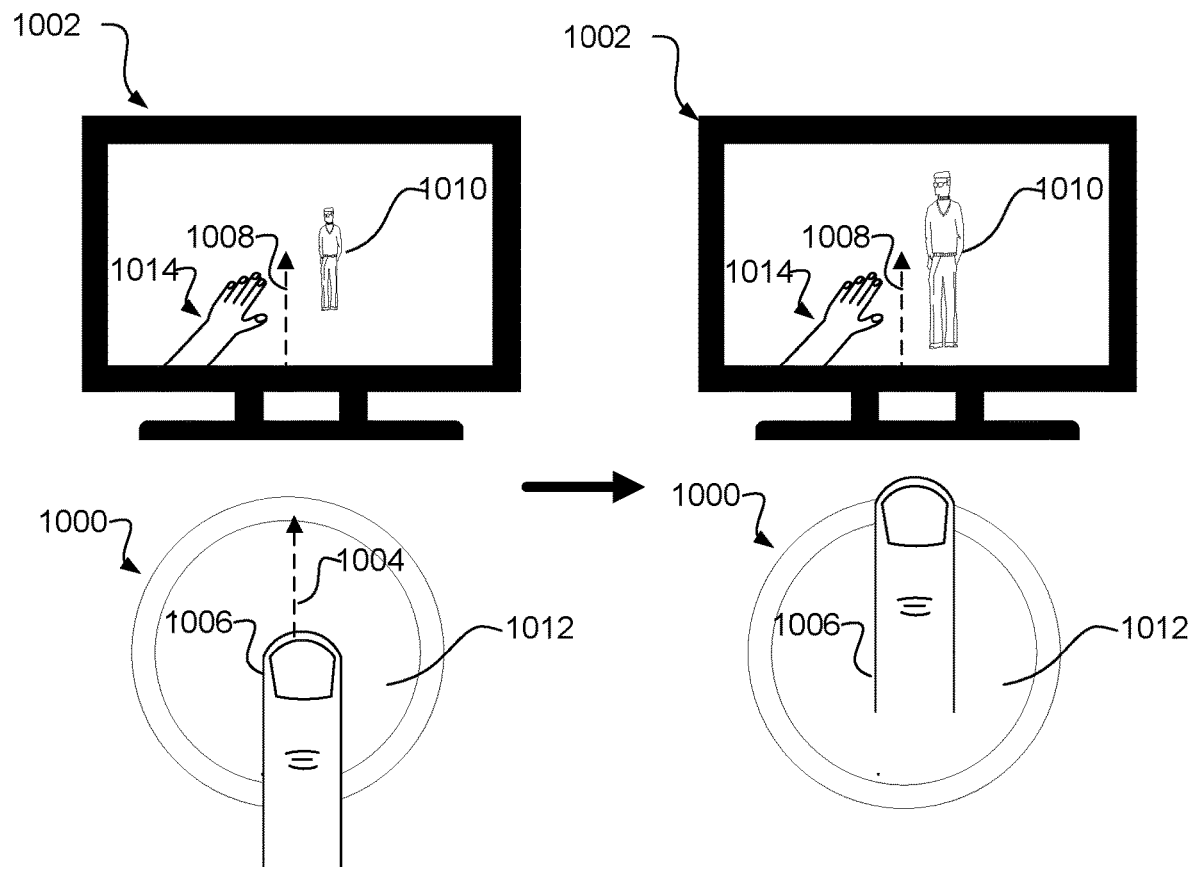
FIG. 10 depicts an example of moving a player character in a video game in accordance with the disclosure.

FIG. 10 depicts an example of capacitance module 1000 and a display 1002. In this example, the object 1006 is a finger which is used to provide inputs to a player character 1014 in a video game whose hand is depicted in the display 1002. In this example, the finger moves across the surface 1012 of the capacitance module along a path 1004 at a certain speed towards the edge of the surface 1012. The display movement vector 1008 is applied to the player character 1014 in accordance with the direction and speed of the finger toward a non-player character 1010. When the finger reaches the edge of the surface 1012 and stops, the display movement vector 1008 continues to be applied to the player character 1014 in the display 1002.

In this example, the display movement vector is applied to the player character in a first-person three-dimensional environment. This sort of environment is common in virtual reality video games. When using virtual reality controllers, often the control of the player character's hands is accomplished by the user moving the controllers in physical space. In a traditional gaming implementation, player character movement may involve repeated movement inputs on the surface of a capacitance module that may result in inconsistent movement of the player character. In this case, a system as depicted in FIG. 10 may improve the movement input method.

For example, if a user were trying to move a player character in a video game towards an objective, the user may enter one input on a virtual reality controller that is detected by the capacitance module when the user's finger moves off the edge of the surface of the capacitance module. The capacitance module may then apply the users input continually on the player character until a new command was input by the user. This may allow the user to freely use his or her hands to interact with the virtual reality environment as the player character moves according to the user input.

Figure 11:
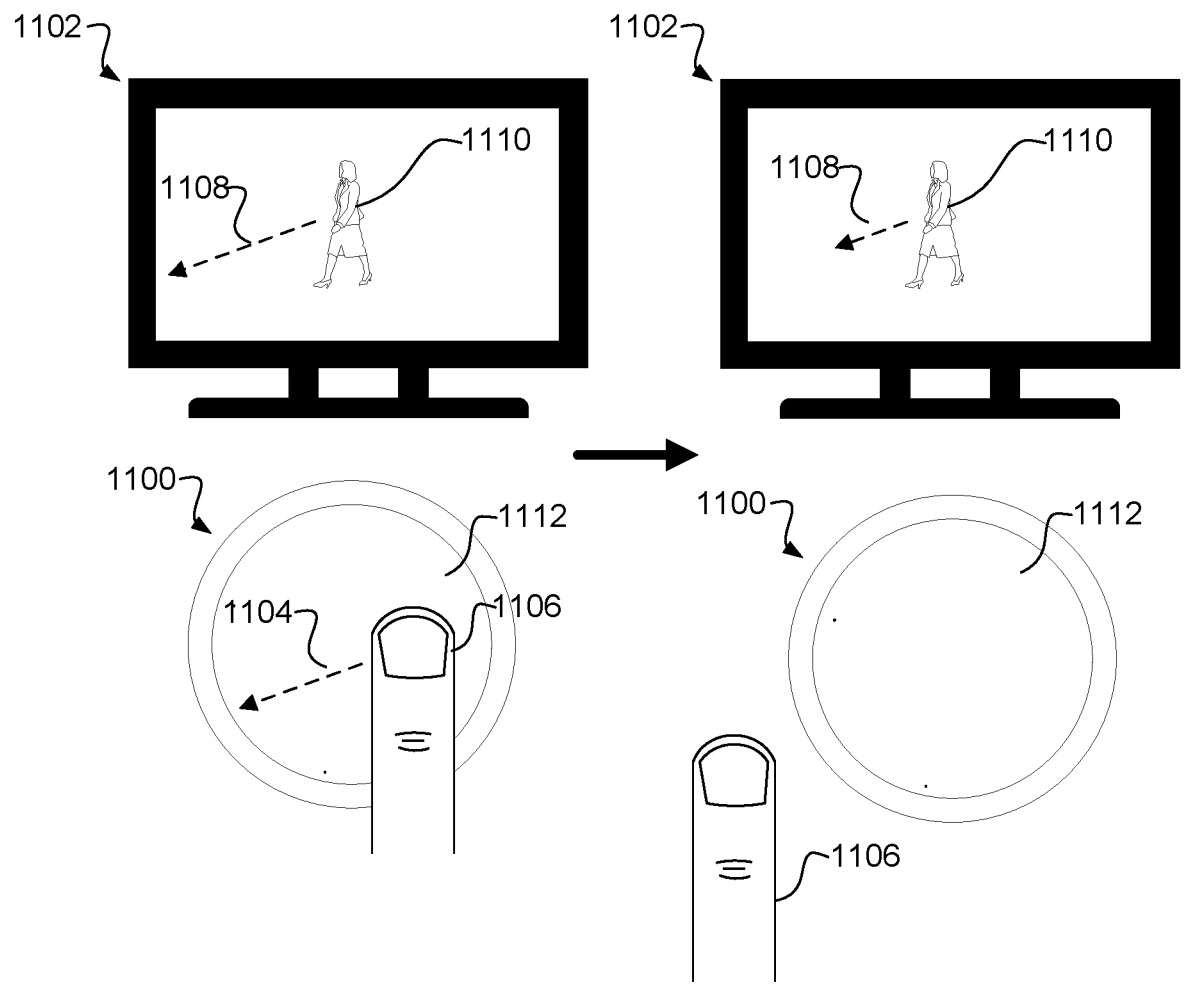
FIG. 11 depicts an example of decreasing the magnitude of an applied movement vector in accordance with the disclosure.

FIG. 11 depicts an example of capacitance module 1100 and a display 1102. In this example, the object 1106 is a finger which is used to provide inputs to an avatar 1110 in a video game depicted in the display 1102. In this example, the finger moves across the surface 1112 of the capacitance module along a path 1104 at a certain speed towards the edge of the surface 1112. The display movement vector 1108 is applied to the avatar 1110 in accordance with the direction and speed of the finger. When the finger reaches the edge of the surface 1112 and leaves the surface, the display movement vector 1108 continues to be applied to the avatar 1110 in the display 1102. After the finger 1106 has left the surface, the display movement vector 1108 applied to the avatar 1110 is decreased gradually over time until the magnitude of the display movement vector goes to zero.

In some examples, the decrease in the speed of the display movement vector is related to the initial speed of the finger as it moved along the path. In some examples, the decrease in the speed of the display movement vector may be affected by repeated similar detected inputs. For example, if multiple inputs are detected moving across the edge of the surface of the capacitance module, it may be determined that the user wants the movement vector to decrease at a slower rate and the capacitance module may adjust accordingly.

Figure 12:
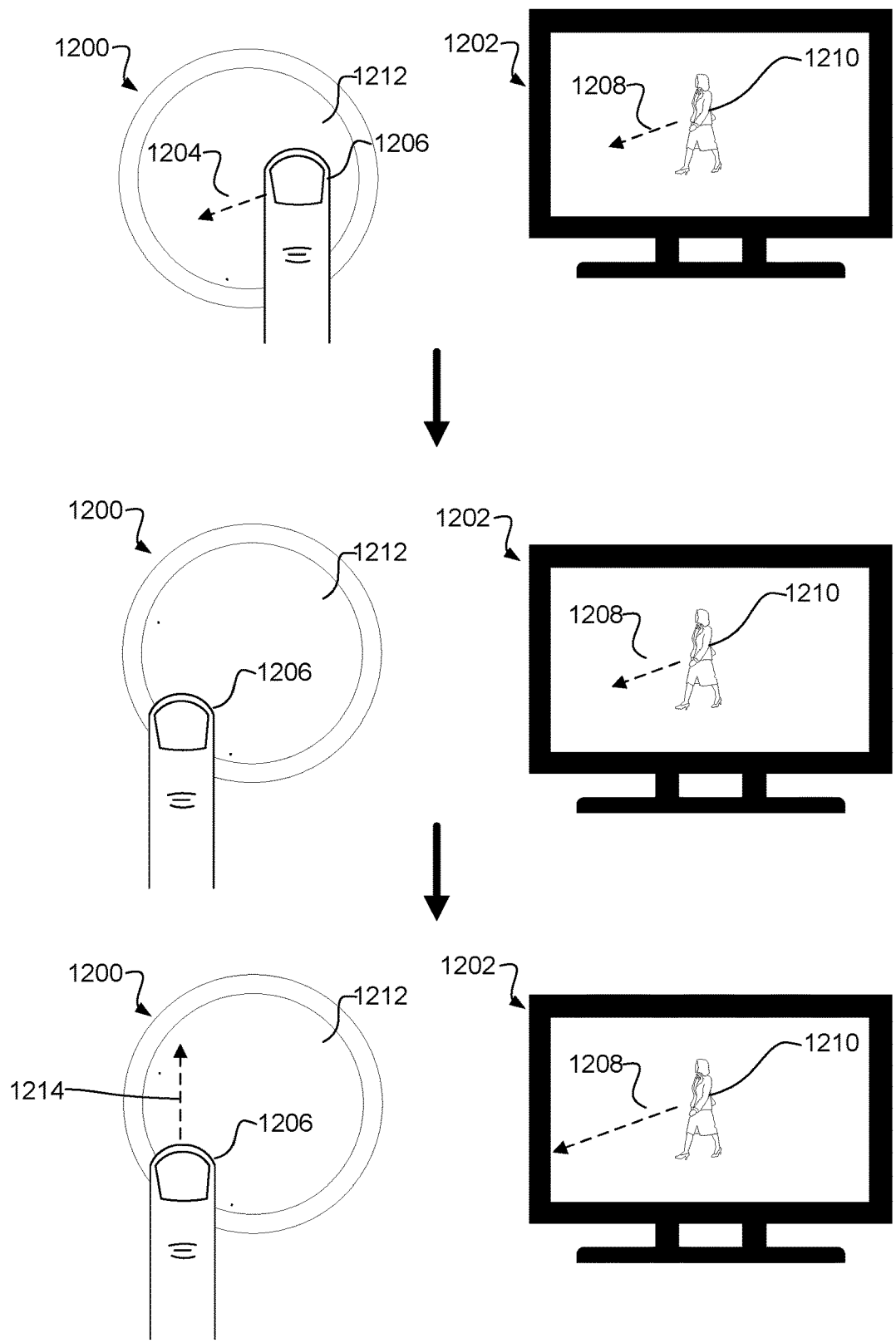
FIG. 12 depicts an example of increasing the magnitude of an applied movement vector in accordance with the disclosure.

FIG. 12 depicts an example of capacitance module 1200 and a display 1202. In this example, the object 1206 is a finger which is used to provide inputs to an avatar 1210 in a video game depicted in the display 1202. In this example, the finger moves across the surface 1212 of the capacitance module along a path 1204 at a certain speed towards the edge of the surface 1212. The display movement vector 1208 is applied to the avatar 1210 in accordance with the direction and speed of the finger. When the finger 1206 reaches the edge of the surface 1212, the display movement vector 1208 continues to be applied to the avatar 1210 in the display 1202. While on the edge of the surface 1212, the finger 1206 moves upward along the edge of the surface 1212. This causes the display movement vector 1208 to be increased in magnitude.

In this example, after the finger reaches the edge of the surface, the avatar continues to move at the speed determined by the initial movement input. A second movement input, along the edge of the surface upward then causes the avatar to increase the speed of the display movement in the display. In this way the user can have more fine control of the display movement vector applied to the avatar. In this example, the second movement input along the edge caused an increase in the magnitude of the display movement vector. In other examples, the second movement input may cause a change in the direction of the display movement vector. In yet other examples, the secondary motion may cause a decrease in the magnitude of the display movement vector. In other examples, the second movement input may cause the avatar to perform some predefined action in the video game.

In some examples, this second movement input after reaching the edge of the surface may be moving the finger downward along the edge of the surface, moving the finger off the surface, moving the finger in the opposite direction of the initial movement input, pressing the finger harder onto the surface, holding the finger on the surface, another input, or a combination of these movement inputs.

Figure 13:
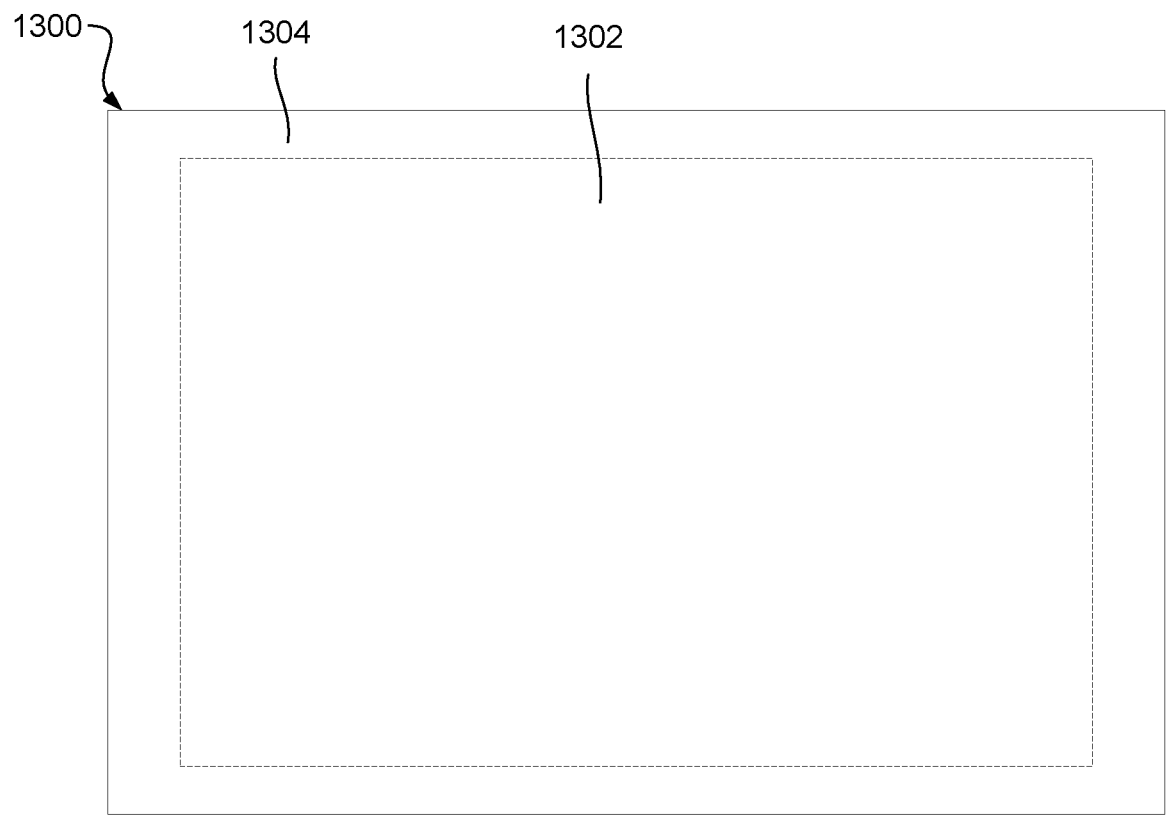
FIG. 13 depicts an example of a rectangular touch pad in accordance with the disclosure.

FIG. 13 depicts an example of a capacitance module 1300 with a rectangular surface 1302. A predefined region 1304 may be the edge of the surface 1302. In this example, the predefined region 1304 may be a region in which a user does not usually move their finger while issuing commands, unless the user is attempting to issue a command to continue applying a movement vector based on a user input.

Figure 14:
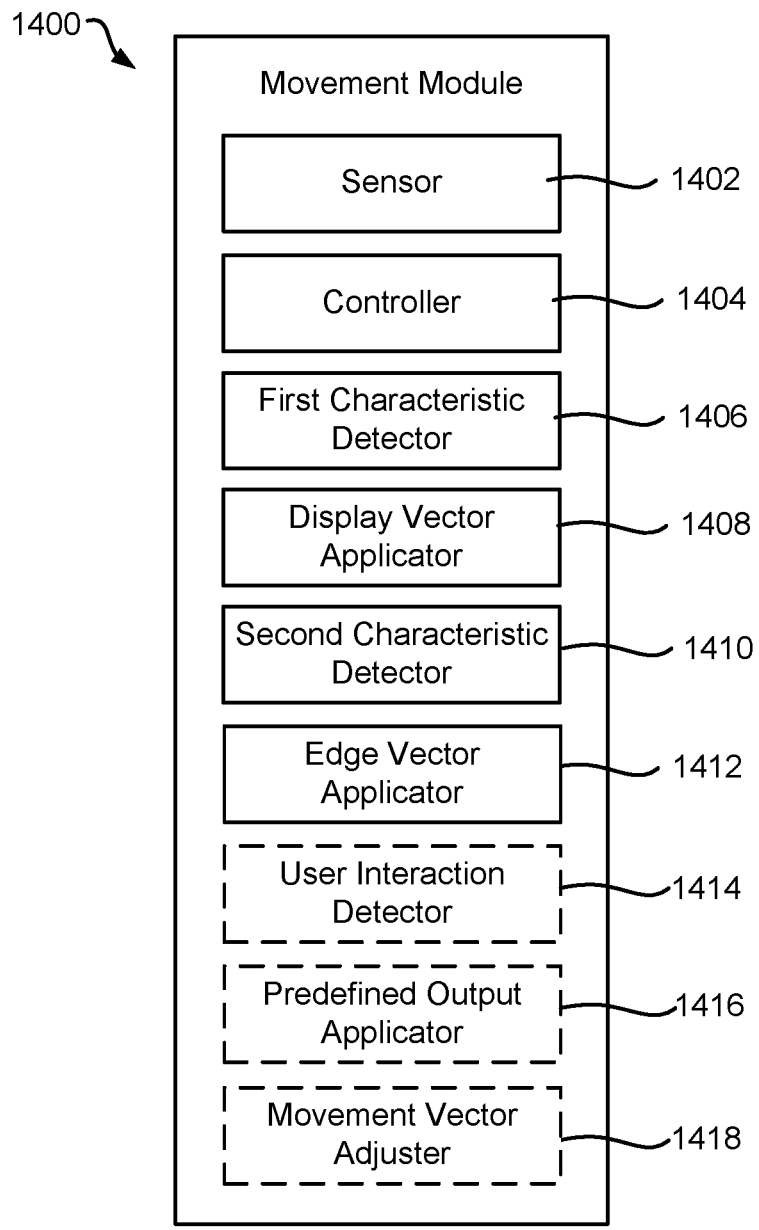
FIG. 14 depicts an example of a movement module in accordance with the disclosure.

FIG. 14 depicts an example of a movement module 1400. In this example, the movement module 1400 includes programmed instructions in memory and may include associated firmware, logic, processing resources, memory resources, power sources, hardware, or other types of hardware to carry out the tasks of the movement module 1400. The movement module 1400 may be used in conjunction with the description of the devices, modules, and principles described in relation to FIGS. 1-13, 15 and 16. In this example, the movement module 1400 includes a sensor 1402, a controller 1404, a first characteristic detector 1406, a display vector applicator 1408, a second characteristic detector 1410, and an edge vector applicator 1412. In some cases, the movement module 1400 optionally includes a user interaction detector 1414. In some cases, the movement module 1400 optionally includes a predefined output applicator 1416. In some cases, the movement module 1400 optionally includes movement vector adjuster 1418.

The sensor 1402 may sense an object moving proximate the sensor. In some cases, a single capacitance sense electrode may be used within the sensor. In other examples, multiple capacitance sense electrodes may be positioned to sense the object moving proximate the sensor.

The controller 1404 may interpret the input of the sensor using programmed instructions stored within memory. In some examples, the controller may send information or commands that are used to control objects in the display.

The first characteristic detector 1406 may detect a capacitance movement vector of a movement input detected by the sensor. This capacitance vector may include both a certain direction and a certain speed. The capacitance vector including both a certain vector and a certain speed can be detected as a first characteristic. In some examples, this movement may be towards an edge of the field of the sensor. In some examples, the detector may store the direction and speed of the capacitance movement vector in memory. In other examples, the detector may store the capacitance movement vector as individual values of time and location along the path of the capacitance movement vector.

The display vector applicator 1408 may apply a display movement vector to an output in a display if the first characteristic detector 1406 detects the first characteristic. In some examples, this display movement vector may be related to the capacitance movement vector of the movement input stored by the first characteristic detector 1406. In some examples, the applicator may apply the display movement vector to an avatar. In other examples, the applicator may apply the display movement vector to a cursor. In other examples, the applicator may apply the display movement vector to a user perspective. In some examples, the display vector applicator may stop applying the display movement vector when the first characteristic detector 1406 stops detecting the first characteristic.

The second characteristic detector 1410 may detect the movement input to the sensor arriving in a predefined region adjacent to the edge of the field of the sensor. In some examples, the second characteristic sensor may store a value in memory to represent the second characteristic has been detected. In some examples, the second characteristic detector may just detect the second characteristic if the first characteristic detector 1206 has detected the first characteristic.

The edge vector applicator 1412 may apply a display movement vector to an output in a display if the second characteristic detector 1410 has detected the second characteristic. In some examples, this display movement vector may be determined by the capacitance movement vector of the input stored by the first characteristic detector 1406. In some examples, the display vector applicator may stop applying the movement vector if the first characteristic detector detects a new first characteristic.

The user interaction detector 1414 may detect a user interaction from the input to the sensor. In some examples, the user interaction detector may determine whether an input on the sensor was a user interaction. In some examples, the user interaction detector may only detect a user interaction if the second characteristic detector 1410 has detected the second characteristic. In other examples, the user interaction detector may only detect a user interaction if the edge vector applicator 1412 is applying a display movement vector.

The predefined output applicator 1416 may apply a predefined output to the display. In some cases, the predefined output applicator may determine what to output based on the user interaction detector 1414. In some examples, the predefined output applicator may stop the edge vector applicator 1412 from applying the display movement vector.

The movement vector adjuster 1418 may adjust the display movement vector being applied with the edge vector applicator 1412. In some examples, the movement adjuster applicator may determine how to adjust the display movement vector based on the user interaction detector. In some examples, the movement vector adjuster may adjust the magnitude of the display movement vector. In other examples, the movement vector adjuster may change the direction of the display movement vector.

Figure 15:
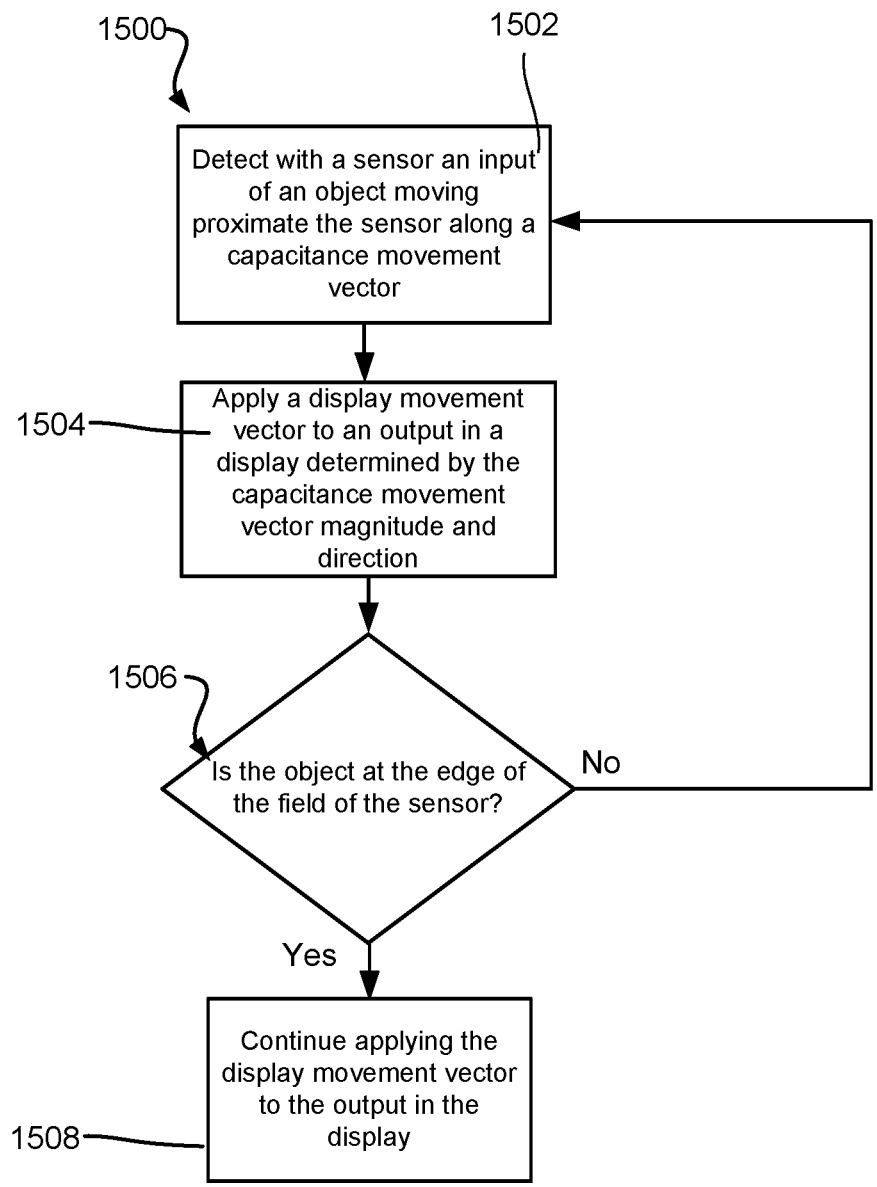
FIG. 15 depicts an example of a method for initiating continued movement in accordance with the disclosure.

FIG. 15 depicts an example of a method 1500 for initiating continued movement. This method 1500 may be performed based on the description of the devices, modules, and principles described in relation to FIGS. 1-14. In this example, the method 1500 includes detecting 1502 with a sensor an input of an object moving proximate the sensor along a capacitance movement vector and applying 1504 a display movement vector to an output in a display determined by the capacitance movement vector magnitude and direction. The method 1500 also includes determining 1506 if the object is at the edge of the field of the sensor. If the object is at the edge of the field of the sensor, then the method 1500 includes continuing 1508 to apply the display movement vector to the output in the display. If the object is not at the edge of the field of the sensor, then the method 1500 includes continuing 1502 to detect with a sensor an input of an object moving proximate a sensor along a capacitance movement vector.

Figure 16:
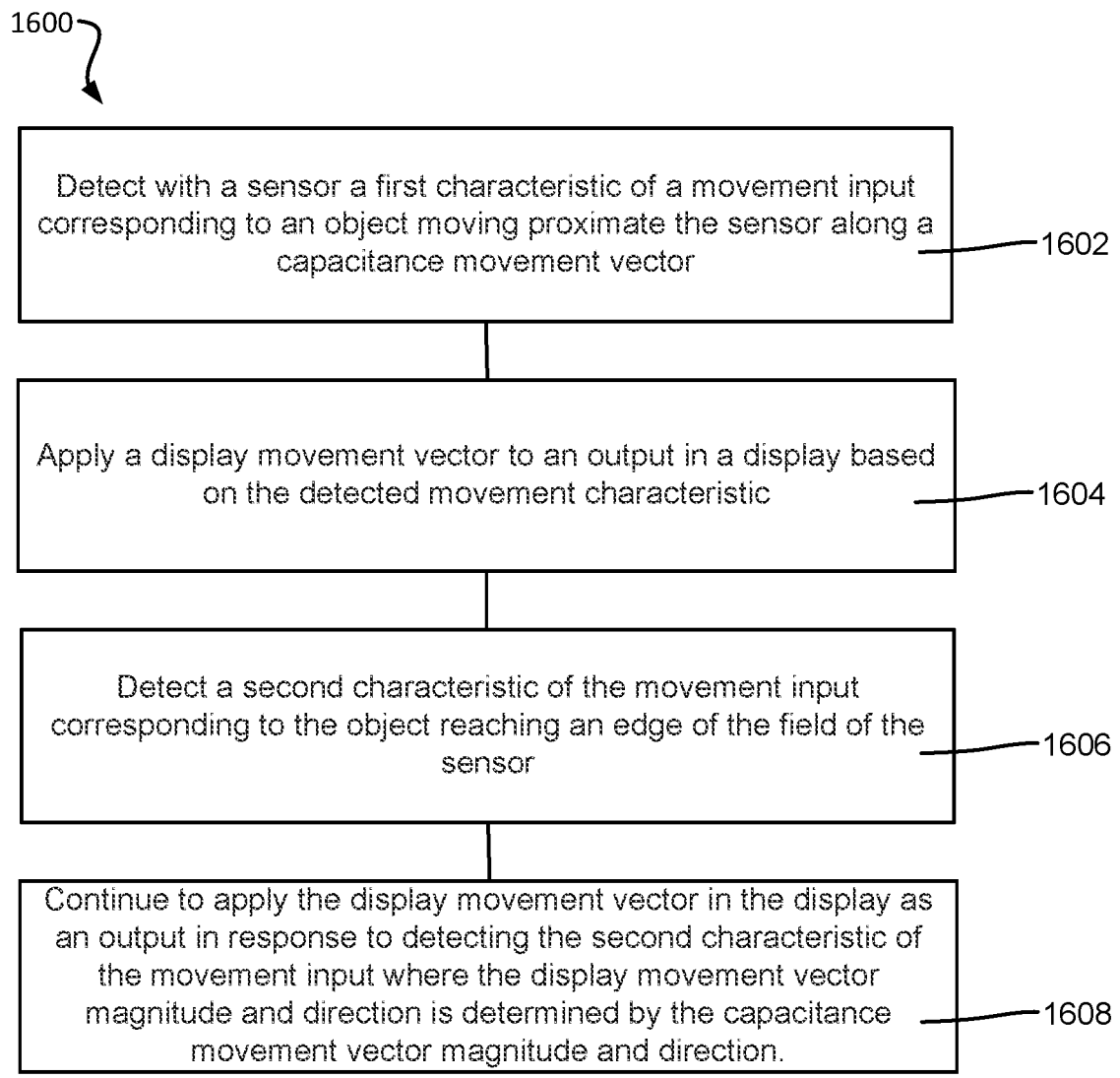
FIG. 16 depicts an example of a method for initiating continued movement in accordance with the disclosure.

FIG. 16 depicts an example of a method 1600 for initiating continued movement. This method 1600 may be performed based on the description of the devices, modules, and principles described in relation to FIGS. 1-15. In this example, the method 1600 includes detecting 1602 with a sensor a first characteristic of a movement input corresponding to an object moving proximate the sensor along a capacitance movement vector, applying 1604 a display movement vector to an output in a display based on the detected movement characteristic, detecting 1606 a second characteristic of the movement input corresponding to the object reaching an edge of the field of the sensor, and continuing 1608 to apply the display movement vector in the display as an output in response to detecting the second characteristic of the movement input where the display movement vector magnitude and direction is determined by the magnitude and direction of the capacitance movement vector.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A system for initiating continued movement output, comprising:
   a capacitance sensor with at least one capacitance sense electrode;
   a controller in communication with the capacitance sensor;
   memory in communication with the controller; and
   programmed instructions stored in the memory and configured, when executed, to cause the controller to:
      detect, with the capacitance sensor, a first characteristic of a movement input corresponding to an object moving proximate the capacitance sensor along a capacitance movement vector;
      apply a display movement vector to an output in a display;
      detect, with the capacitance sensor, a second characteristic of the movement input corresponding to the object moving beyond an edge of the field of the capacitance sensor; and continue to apply the display movement vector in the display as an output in response to detecting the second characteristic of the movement input;
wherein the display movement vector magnitude and direction are determined by the capacitance movement vector magnitude and direction;
wherein the programmed instructions are configured, when executed, to cause the magnitude of the display movement vector to decrease over time;
wherein the decrease in the magnitude of the display movement vector is determined by user interaction;
wherein the user interaction includes repeated detected inputs; and
wherein the decrease in the magnitude of the display movement vector in response to repeated detected inputs includes detecting multiple movement inputs along capacitance movement vectors with the same direction within a predetermined amount of time.

2. The system of claim 1, wherein the capacitance sensor is a part of a virtual reality controller.

3. The system of claim 1, wherein the programmed instructions are configured, when executed, to cause the output to be interrupted in response to detecting a user interaction.

4. The system of claim 1, wherein the direction of the display movement vector and capacitance movement vector include both an x and a y component.

5. The system of claim 1, wherein the output controls an avatar in the display.

6. The system of claim 1, wherein the output controls a cursor in the display.

7. The system of claim 1, wherein the output controls user perspective in the display.

8. The system of claim 1, wherein the programmed instructions are configured, when executed, to detect the second characteristic of the movement input within a predefined area adjacent to the edge of the field of the capacitance sensor.

9. The system of claim 8, wherein the predefined area is within at least 5% of a dimension of the capacitance sensor to the edge of the field of the capacitance sensor.

10. The system of claim 1, wherein the programmed instructions are configured, when executed, to apply a predefined output in response to detecting user interaction after detecting the second characteristic of the movement input.

11. The system of claim 1, wherein the programmed instructions are configured, when executed, to discontinue to apply the display movement vector in response to a user command.

12. The system of claim 1, wherein the magnitude of the display movement vector may be decreased over time based, at least in part, by an initial magnitude of the capacitance movement vector.

13. A computer-program product for initiating continued movement output, the computer-program product comprising a non-transitory computer-readable medium storing instructions executable by a processor to:
detect a first characteristic of a movement input corresponding to an object moving proximate a capacitance sensor along a capacitance movement vector;
apply a display movement vector to an output in a display;
detect a second characteristic of the movement input corresponding to the object reaching an edge of the field of the capacitance sensor; and
continue to apply the display movement vector in the display as an output in response to detecting the second characteristic of the movement input;
wherein the display movement vector magnitude and direction are determined by the capacitance movement vector magnitude and direction;
wherein the programmed instructions are configured, when executed, to cause the magnitude of the display movement vector to decrease over time;
wherein the decrease in the magnitude of the display movement vector is determined by user interaction;
wherein the user interaction includes repeated detected inputs; and
wherein the decrease in the magnitude of the display movement vector in response to repeated detected inputs includes detecting multiple movement inputs along capacitance movement vectors with the same direction within a predetermined amount of time.

14. The computer-program product of claim 13, wherein the programmed instructions are configured, when executed, to detect the second characteristic of the movement input within a predefined area adjacent to the edge of the field of the capacitance sensor.

15. The computer-program product of claim 13, wherein the output controls an avatar in the display.

16. A method for initiating continued movement output, comprising:
detecting a first characteristic of a movement input corresponding to an object moving proximate a capacitance sensor along a capacitance movement vector;
applying a display movement vector to an output in a display;
detecting a second characteristic of the movement input corresponding to the object reaching an edge of the field of the capacitance sensor; and
continuing to apply the display movement vector in the display as an output in response to detecting the second characteristic of the movement input;
wherein the display movement vector magnitude and direction are determined by the capacitance movement vector magnitude and direction;
wherein the programmed instructions are configured, when executed, to cause the magnitude of the display movement vector to decrease over time;
wherein the decrease in the magnitude of the display movement vector is determined by user interaction;
wherein the user interaction includes repeated detected inputs; and
wherein the decrease in the magnitude of the display movement vector in response to repeated detected inputs includes detecting multiple movement inputs along capacitance movement vectors with the same direction within a predetermined amount of time.

* * * * *